(No Model.)

3 Sheets—Sheet 1.

J. A. GRAHAM.

KNOT TYER FOR GRAIN BINDERS.

No. 397,355. Patented Feb. 5, 1889.

Witnesses:
E. G. Lemmis
N. E. Oliphant

Inventor:
James A. Graham
By Stout & Underwood
Attorneys:

N. PETERS, Photo-Lithographer, Washington, D. C.

(No Model.) 3 Sheets—Sheet 2.

J. A. GRAHAM.

KNOT TYER FOR GRAIN BINDERS.

No. 397,355. Patented Feb. 5, 1889.

Witnesses
E. G. Ammer
M. E. Oliphant

Inventor:
James A. Graham
By Stout & Underwood
Attorneys.

N. PETERS, Photo-Lithographer, Washington, D. C.

J. A. GRAHAM.
KNOT TYER FOR GRAIN BINDERS.
No. 397,355. Patented Feb. 5, 1889.
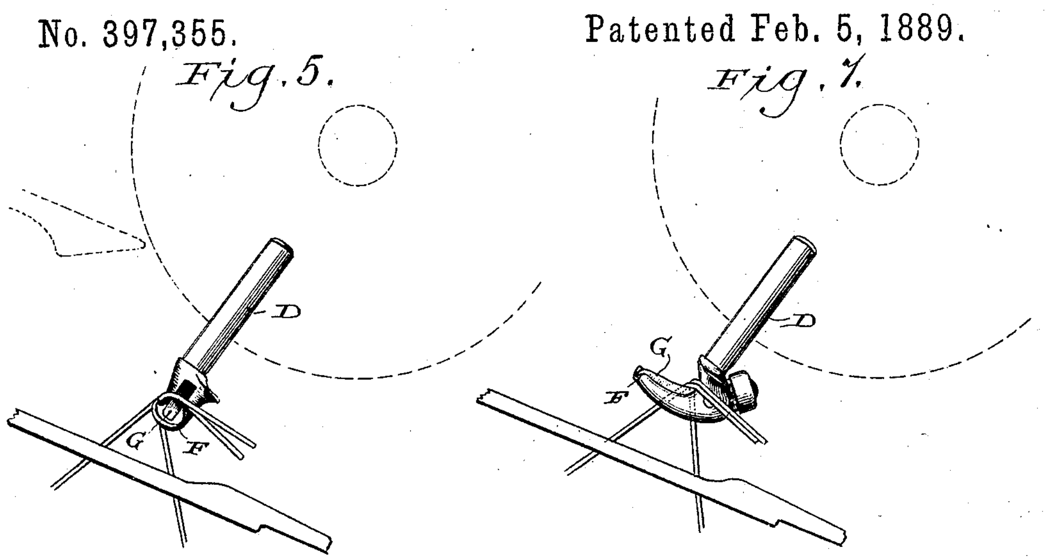
Fig. 5. Fig. 7.
Fig. 6.
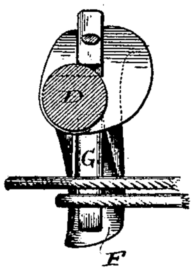
Fig. 8.
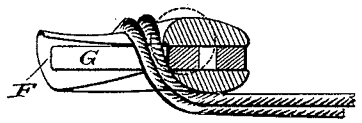
Fig. 9.
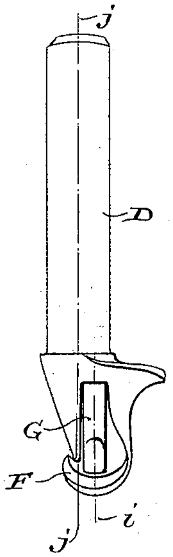
Fig. 10.
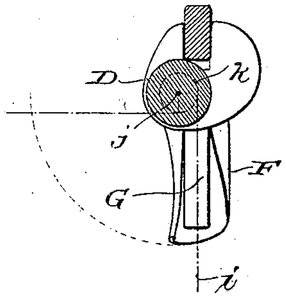
Witnesses,
Geo. W. Young
N. E. Oliphant.
Inventor,
James A. Graham
By Stout & Underwood
Attorneys.
N. PETERS, Photo-Lithographer, Washington, D. C.

UNITED STATES PATENT OFFICE.

JAMES A. GRAHAM, OF MILWAUKEE, WISCONSIN, ASSIGNOR TO THE MILWAUKEE HARVESTER COMPANY, OF SAME PLACE.

KNOT-TYER FOR GRAIN-BINDERS.

SPECIFICATION forming part of Letters Patent No. 397,355, dated February 5, 1889.

Application filed February 8, 1886. Serial No. 191,179. (No model.)

*To all whom it may concern:*

Be it known that I, JAMES A. GRAHAM, of Milwaukee, in the county of Milwaukee, and in the State of Wisconsin, have invented certain new and useful Improvements in Knot-Tyers for Grain-Binders; and I do hereby declare that the following is a full, clear, and exact description thereof.

My invention relates to knotting mechanism of grain-binders; and it consists in certain peculiarities of construction and combination of parts to be hereinafter described with reference to the accompanying drawings, and subsequently claimed.

Figures 1, 2:
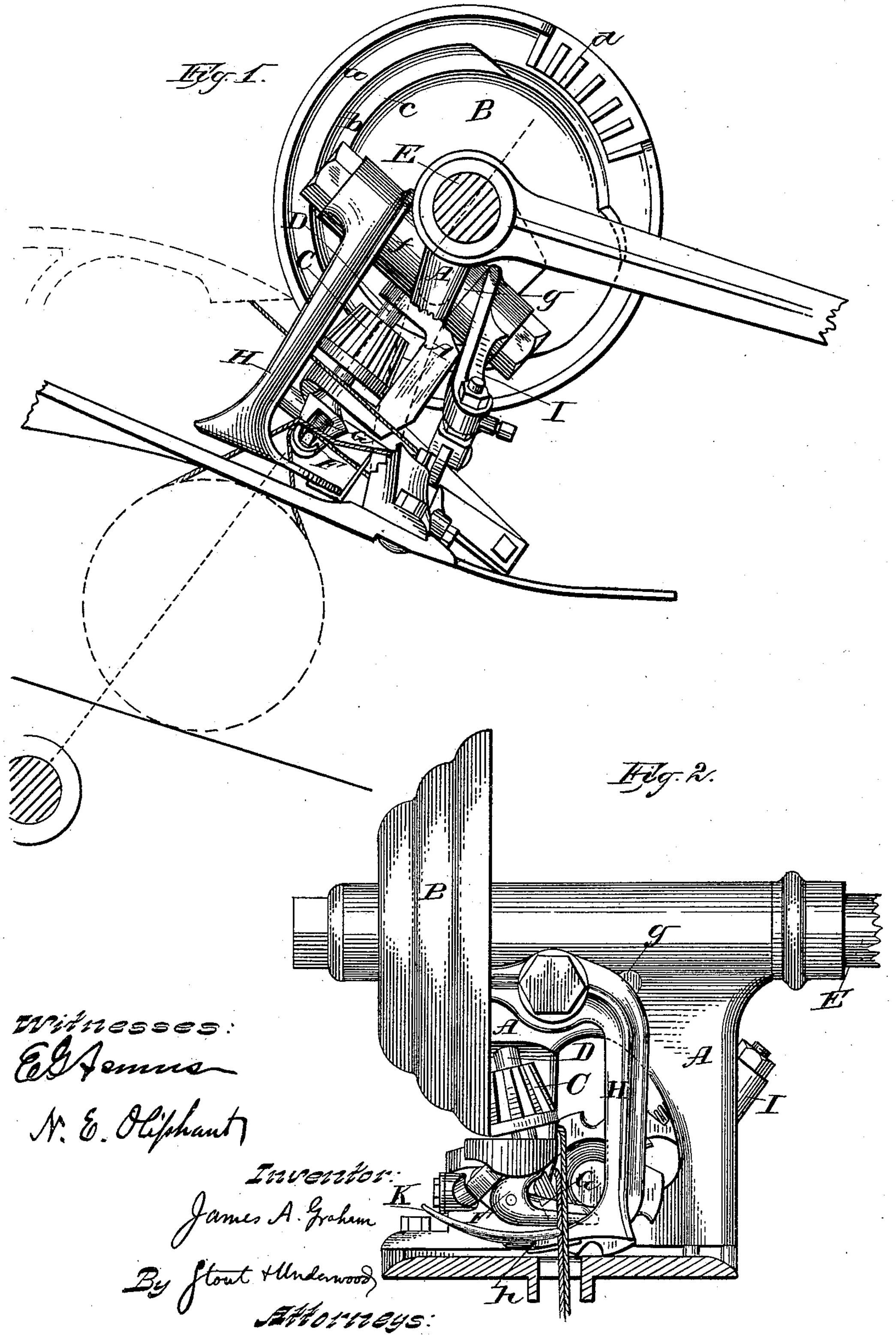
Figures 3, 4:
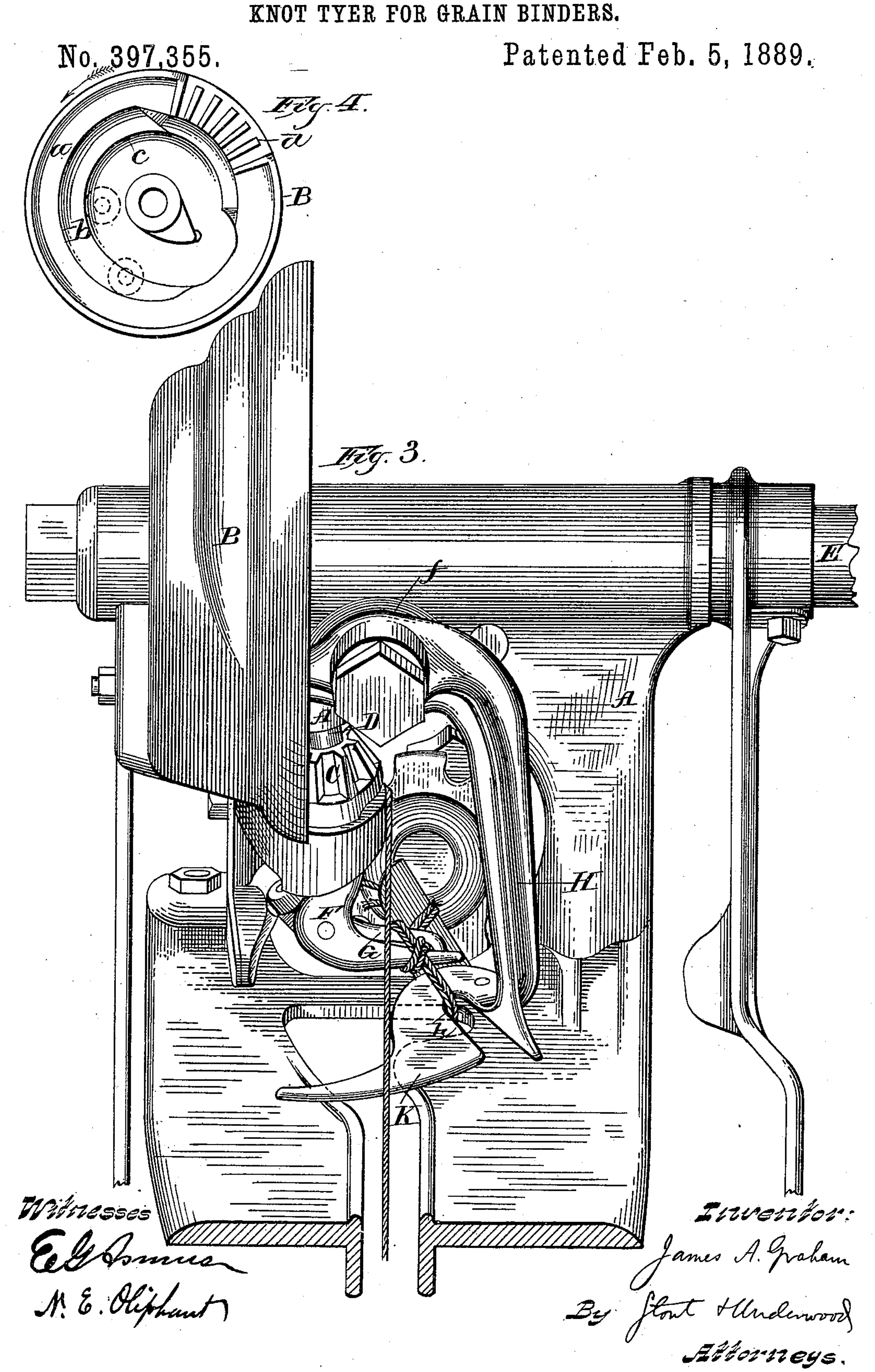

In the drawings, Figure 1 represents a side view of a knotter-frame embodying my invention; Fig. 2, a rear view of the same. Fig. 3 is an enlarged perspective view looking from the rear; Fig. 4, a detail view of the cam-wheel; Fig. 5, a detail view showing the knotter in its normal position and the cord laid thereon; Fig. 6, a plan view of the parts shown in Fig. 5, the shank being illustrated in transverse section; Fig. 7, a detail view showing the position of the cord with relation to the knotter after the latter has made a quarter-turn; Fig. 8, a transverse section showing the knotter-bill and cord in plan and in the same relative position as shown by Fig. 7; Fig. 9, an elevation of the knotter, the centers of the shank and bill being indicated by dotted lines; and Fig. 10, a view of the knotter, partly in transverse section and partly in plan, the relative centers of the shank and bill and the action of said knotter being illustrated by a diagram in dotted lines.

Referring by letter to the drawings, A represents the knotter-frame; B, the cam-wheel, provided with tracks *a b c* and a rack, *d*, the latter coming into mesh at the proper time with a bevel-pinion, C, on a knotter-shank, D, that has its bearings in said knotter-frame.

The frame A is provided with studs *f g* at practically right angles to the cam-shaft E, and to these studs are respectively pivoted the usual knife-arm, H, and bell-crank lever I. The knife-arm H is provided with the usual cord-guide, K, the notch *h* of which receives the cord as the needle enters the knotter-frame.

The outer track, *a*, of the cam-wheel B is the delay-surface for the bevel-pinion C on the knotter-shank D, the central track, *b*, being the path for the roulette on the bell-crank lever I, that operates the cord-guide K, and the inner track, *c*, is the path for the roulette on the knife-arm H, the relative position of said roulettes being shown by dotted lines in Fig. 4.

In the ordinary form of knotter the upper side of the bill F is flush with the adjacent upper side of the shank D, and when said knotter is rotated there is a tendency to force the cord out toward the end of said bill, thus making it easy for the latter to slip past said cord—a result that frequently occurs.

My knotter is so cast that a longitudinal line, *i*, drawn through the center of the lower jaw, F, of the bill does not intercept the axis *j* of said knotter at right angles, as is the case in knotters of the usual construction, but forms a tangent on the right of a circle, *k*, struck from said axis, as best illustrated in Fig. 10. As a result of the peculiar construction just described, the upper pivoted jaw, G, of the knotter does not intercept the axis *j* of the device, but comes entirely on the right side of said axis, as best illustrated by Figs. 9 and 10.

The general construction and operation of the tyer mechanism being well known, I do not deem it necessary to describe the same at length, and will therefore confine myself to the peculiar action of the knotter that constitutes my invention.

By the peculiar construction above described the working side of the knotter-bill, instead of being approximately flush with the adjacent side of the shank, as in the usual form of knotters, is offset from said side of the shank a distance approximately equal to that between the longitudinal line *i* drawn through the center of said bill and the axis *j*, on which the knotter revolves. In consequence of this construction the rotation of the knotter does not cause the working side of its bill to strain upon the cord, as is ordinarily the case; but, on the contrary, the knotter-bill merely travels around said cord and the latter draws in toward the knotter-shank, as illustrated by Figs. 7 and 8, the draw taking place while said knotter is making a quarter-turn, as illustrated by the dotted diagram in Fig. 10, the line $i$ being constantly at a tangent to the circle $k$ struck from the axis $j$.

The operation just described insures against the disengagement of the knotter-bill and cord while a loop is being formed, regardless of the strain upon said cord and the jarring of the machine.

Having thus fully described my invention, what I claim as new, and desire to secure by Letters Patent, is—

In a knotting mechanism for grain-binders, a knotter having the lower jaw of its bill arranged with relation to the shank so that a longitudinal line drawn through the center of this jaw forms a tangent to a circle struck from the axis of the knotter and the working side of said jaw is offset from the adjacent side of said shank a distance approximately equal to that between the longitudinal line and axis, substantially as and for the purpose set forth.

In testimony that I claim the foregoing I have hereunto set my hand, at Milwaukee, in the county of Milwaukee and State of Wisconsin, in the presence of two witnesses.

JAMES A. GRAHAM.

Witnesses:
H. G. UNDERWOOD,
MAURICE F. FREAR.